(12) United States Patent
Bivens et al.

(10) Patent No.: US 8,478,624 B1
(45) Date of Patent: Jul. 2, 2013

(54) QUALITY OF RECORDS CONTAINING SERVICE DATA

(75) Inventors: John A. Bivens, Ossining, NY (US); Valentina Salapura, Chappaqua, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/551,277

(22) Filed: Jul. 17, 2012

Related U.S. Application Data (60) Provisional application No. 61/614,182, filed on Mar. 22, 2012.

(51) Int. Cl.
*G06Q 10/10* (2012.01)

(52) U.S. Cl.
USPC ... 705/7.12; 707/687; 707/748; 707/999.006; 707/E17.044; 707/E17.084

(58) Field of Classification Search
None
See application file for complete search history.

(56) References Cited

U.S. PATENT DOCUMENTS

| | | | | |
|---|---|---|---|---|
| 6,493,694 | B1* | 12/2002 | Xu et al. | 706/47 |
| 6,941,514 | B2* | 9/2005 | Bradford | 715/700 |
| 6,970,881 | B1* | 11/2005 | Mohan et al. | 1/1 |
| 7,647,391 | B1* | 1/2010 | Jean et al. | 709/223 |
| 7,925,638 | B2 | 4/2011 | Sengupta et al. | |
| 7,930,302 | B2* | 4/2011 | Bandaru et al. | 707/737 |
| 8,010,480 | B2* | 8/2011 | Dave et al. | 706/62 |
| 8,321,232 | B2 | 11/2012 | Sunday et al. | |
| 2005/0060313 | A1* | 3/2005 | Naimat et al. | 707/7 |
| 2006/0173924 | A1* | 8/2006 | Wotton et al. | 707/200 |
| 2006/0277173 | A1* | 12/2006 | Li et al. | 707/5 |
| 2007/0016580 | A1* | 1/2007 | Mann et al. | 707/6 |
| 2007/0016897 | A1* | 1/2007 | Todd | 717/143 |
| 2008/0263019 | A1* | 10/2008 | Harrison et al. | 707/4 |
| 2009/0276283 | A1* | 11/2009 | Sunday et al. | 705/9 |
| 2010/0205032 | A1* | 8/2010 | Nielsen et al. | 705/9 |
| 2011/0246251 | A1* | 10/2011 | Saunders et al. | 705/7.12 |

OTHER PUBLICATIONS

Bernstein, Abraham, and Jiwen Li. "From active towards interactive learning: using consideration information to improve labeling correctness." University of Zurich, Department of Informatics, Dynamic and Distributed Information Systems Group Working Paper. www.ifi. uzh. ch/ddis/nc/publications (2009).*

Zia, Leila, et al. "Optimizing change request scheduling in IT service management." Services Computing, 2008. SCC'08. IEEE International Conference on. vol. 1. IEEE, 2008.*

Marcu, Patricia, et al. "Towards an optimized model of incident ticket correlation." Integrated Network Management, 2009. IM'09. IFIP/IEEE International Symposium on. IEEE, 2009.*

(Continued)

*Primary Examiner* — Jonathan G Sterrett
*Assistant Examiner* — Tzu-Hsiang Lan
(74) *Attorney, Agent, or Firm* — Yee & Associates, P.C.; Louis J. Percello (57) ABSTRACT

An embodiment of the invention, directed to assessing quality of recorded service data, comprises the step of receiving a record containing service data at a service record evaluator. The method further comprises selecting at least one information field of a plurality of information fields contained in the received record, and determining a numerical quality score for each selected information field. Each of the quality scores is used to compute a cumulative quality score for the record, and it is determined whether the cumulative quality score is no less than a minimum quality threshold.

11 Claims, 7 Drawing Sheets

OTHER PUBLICATIONS

Bivens et al., "h-IQ: Human Intelligence for Quality of Service Delivery Data", USPTO Provisional Application No. 61/614,182, filed Mar. 22, 2012, 39 pages.

Bivens et al., "Quality of Records Containing Service Data", U.S. Appl. No. 13/584,378, filed Aug. 13, 2012, 32 pages.

Office Action issued on Nov. 8, 2012 for U.S. Appl. No. 13/584,378, 24 pages.

Notice of Allowance issued on Mar. 5, 2013 for U.S. Appl. No. 13/584,378, 23 pages.

\* cited by examiner

| WONUM | WORK ORDER DESCRIPTION | SERVICE ORDER NUMBER |
|---|---|---|
| WO-123 | TEAM MEETING ON MAXIMO UTILITY | SO-Num-1 |

| SERVICE ORDER DESCRIPTION | CLASSIFICATION ID | CLASSIFICATION DESCRIPTION | CUSTOMER |
|---|---|---|---|
| TEAM MEETING | Class-ID-77 | OTHER | ACME |

| SUB ACCOUNT | WORKTYPE |
|---|---|
|  |  |

| EXTERNAL TICKET NUMBER | EXTERNAL TICKET CREATION DATE | EXTERNAL TICKET SEVERITY | WO PRIORITY | ACTUAL LEAN | DEFAULT LEAN | REPORTED LEAN | ASSIGNED LEAN | STATUS DATE | SERVICE LINE TEAM |
|---|---|---|---|---|---|---|---|---|---|
|  |  |  | 4 | BLD | BLD | SME-1 | SME-2 | ##### |  |

| STATUS | REPORTED DATE TIME | REPORTED DATE | REPORTED DAYS | REPORTED DAYS | REPORTED DAYS | REPORTED DAYS | ACTUAL START | TARGCOM | MINUTES TO | DATE OF AS | RECEIVE TO | MEAN TIME | ACTUAL DUR |
|---|---|---|---|---|---|---|---|---|---|---|---|---|---|
| CLOSE | 3/11/2010 7:32 | 3/11/2010 | 3 | 11 | 5 | 7 | ##### |  |  |  | 0 | 0 |  |

| ACTUAL FINISH DATE TIME | ACTUAL FINISH DATE | AS ACTUAL FINISH | ACTUAL FINISH | ACTUAL FINISH | ACTUAL FINISH | SCHED START | SCHED START | SCHED START | SCHED START | SCHED START | SCHED START | SCHED FINISH | SCHED FINISH |
|---|---|---|---|---|---|---|---|---|---|---|---|---|---|
| 3/11/2010 7:32 | 3/11/2010 | 3 | 11 | 5 | 7 |  |  |  |  |  |  |  |  |

| CLOSURE CODE | FAILURE CLASS | FAILURE SYMPTOM | FAILURE CA | FAILING COMPONENT | FAILING COMPONENT | RESOLUTION |
|---|---|---|---|---|---|---|
| COMPLETED |  |  |  |  |  |  |

QUALITY OF RECORDS CONTAINING SERVICE DATA

This application claims the benefit of priority to U.S. Provisional Application Ser. No. 61/614,182, filed on Mar. 22, 2012 and entitled "h-IQ: Human Intelligence for Quality of Service Delivery Data". The contents of which are hereby incorporated herein by reference.

BACKGROUND

1. Field

The invention pertains to enhancing the quality of recorded service data, such as data recorded on service tickets, in a data center or call center.

2. Description of the Related Art

Service delivery centers are large, complex and dynamic ecosystems, which engage hundreds of thousands of experts globally to manage thousands of processes supporting thousands of IT systems with hundreds of configurations. While operations at service delivery centers are typically associated with back-end processes, its efficiency affects quality at front-end (e.g., client experience and satisfaction).

Multiple ticketing systems, data stores and warehouses trace the operations in service delivery centers. They capture practices of Subject Matter Experts (SMEs), who are typically System Administrators (SAs), and changes in the IT infrastructure (e.g., server decommissioning). These ticketing systems, and enterprise-level warehouses are only as reliable as their sources, whether human-driven (tickets submitted by SAs) or system-driven (automated updates of server registries).

All too often, there is poor quality of captured data when managing a data center or call center. Administrators are time pressured to achieve high throughput and problem resolution, and no incentive exists for quality of records and logs when capturing and describing problems and resolutions. Low quality of such data leads to inefficiencies in operations (e.g., incomplete tickets slow down the problem resolution process), or leads business analytics to reach wrong or suboptimal conclusions. Frequently, data records such as tickets are blank with insufficient data, and as such are unusable.

Moreover, low quality of data affects the business decisions (e.g., leading to poor business insights when identifying opportunities for new service offerings, such as "show me the low utilization servers across the banking sector"). Business insights and problem resolution processes require careful quality assessment to build credibility with stakeholders and efficiently resolve problem tickets. Moreover in such volatile environments, quality of operations and business insights will vary depending on the corresponding data source.

Planning activities also depend on good quality data. Take for example server consolidation, where old servers or underutilized servers are migrated into virtual environments with newer hardware. Being able to understand the configuration information such as number of CPUs, speed, memory, operating system and software configured as well as resource information such as network bandwidth, disk and CPU utilization are all key to be able to prepare a plan that maps to proper sized servers. Bad quality data could easily derail a plan from improper source selection to bad target allocations.

Accumulated problem resolution records contain tremendous source of information about the managed system, its efficiencies and weaknesses, and in addition to analytics, it is a valuable source for knowledge transfer and learning in attempt to train new administrators. The record data are also used for reporting and report generation in billing and service level agreement (SLA) measurements.

Accurate records of services provided are valuable for a number of business aspects. These include planning of future system improvements, automating problem resolution, optimization of tasks, and awarding the best administrators and skill development. It would be desirable to have a way to improve capturing of incident and problem description and resolution in a data or call center.

SUMMARY

Embodiments of the invention include a method to enhance the quality of recording service data in a data center or call center. Embodiments enforce system administrators to make better documentation when working on a problem or on a work item by incorporating a log record grading system within the ticketing tool. This approach automatically evaluates the quality of captured data, and may not allow closing of the tickets if sufficient information within a ticket is not available, in this way enforcing the enhanced results of records logs, and resulting in a higher quality of recorded data.

More particularly, before a ticket for any work item is closed (i.e., marked completed), the quality of the recorded data is automatically evaluated, and a score is assigned to each data record. A "ticket evaluator" will evaluate each ticket based on its content, and assign it a grade. Tickets with insufficient quality cannot be closed; instead, immediate improvement of ticket quality is enforced.

An embodiment of the invention, directed to a method for assessing quality of recorded service data, comprises the step of receiving a record containing service data at a service record evaluator. The method further comprises selecting at least one information field of a plurality of information fields contained in the received record, and determining a numerical quality score for each selected information field. Each of the quality scores is used to compute a cumulative quality score for the record, and it is determined whether the cumulative quality score is no less than a minimum quality threshold.

BRIEF DESCRIPTION OF THE SEVERAL VIEWS OF THE DRAWINGS

FIG. 3 shows a ticket with certain fields, for evaluation in accordance with an embodiment of the invention;

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Initial Considerations

Service systems can be conceptualized as a stage with front-end (client-facing) and back-end (operations) functions. As a result, to meet the quality expectations and reduce operating costs, the providers need to continuously improve services quality both at front-end (e.g., client experience and satisfaction), and back-end (e.g., production and delivery).

Service delivery centers tend to host large numbers of customers, each customer with its own policies, and regulations that they need to adhere to. Applications will vary, the software stacks in use will be different, and the processes to manage them will have their own adaptations. For the service provider that owns the delivery center there is the incentive to leverage economies of scale and seek to standardize wherever possible across as many accounts as possible. Such efforts may include common tools to manage environments, or consolidation into less platforms, or unification of processes to manage incidents, problems and changes, to name a few. Many of these rely on availability of quality data in order to make sensible decisions. One such data is configuration information. Discovery tooling if available and properly configured with credential information can scan the endpoints and report on configuration and dependencies.

However, as configuration changes, new scans are required, and if the credentials change or the agents fail, it is possible to easily fall behind. Discovery information although potentially extensive is not able to capture the business purpose, or business requirements leaving it up to the application owner to provide it. As any user provided data, it is as transient as the configuration it describes. If any major change occurs it should be revised, including addition of new components or applications, repurposing the server, or decommissioning it altogether.

Another source of data often used on consolidation decisions is resource management information. This information is captured by agents that regularly report on the utilization of resources such as memory, disk, and network, to name a few. If the agent ceases to execute, information will become stale very quickly. Moreover, unless there is good lifecycle management it may not be clear if when reporting stops is because of a failure or perhaps a customer decision or the server was just decommissioned. The mere fact that the agent needs to "steal" resources to execute is sometimes enough reason to shut it down in critical times or disallowing it for mission critical environments. Creating a situation, like all the ones just described above where the data quality about the environment starts to differ from server to server and account to account, interferes with any effort to standardize the operations and cost effectiveness of the service delivery and associated services quality.

Figure 1B:
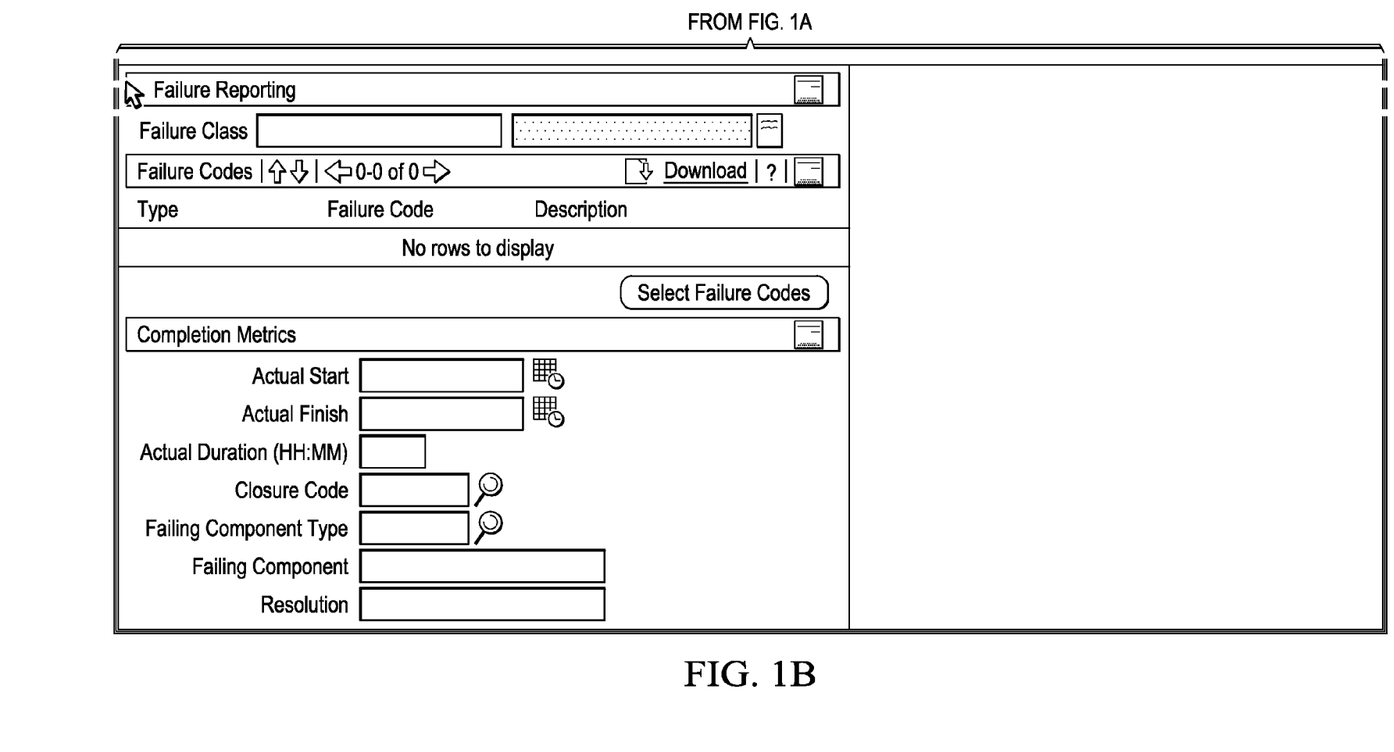
FIG. 1 depicts a ticketing tool which may be used with an embodiment of the invention.

From the front-end perspective of operations, many companies have customer service departments to provide customer service support. Every customer support request generates service logs and records. These records in the IT Service Support and Delivery organization are recorded by system administrators, and are referred to as ticket data, where every service request represents a ticket. Referring to FIG. 1, there is shown a sample ticketing record. Similarly, in customer support call centers, every interaction with customer and customer request is documented. The tickets contain information as reported by a customer describing experienced problem symptoms, or a new service needed, and represent a link between customers and the services infrastructure. Opened tickets are queued in the ticketing system, and dispatched to the appropriate system administrator, service center, or an agent for handling and resolution.

Service centers typically collect service data which can then be used to assess and improve the performances of their representatives. In managing an IT data center, ticket data can be used to understand the distribution of underlying issues typically encountered in the operation of a data center for future planning. While underlying techniques and tools are applicable on different service centers, in this work the focus is on managing an IT data center. Ticket data spans from resolving issues to customer meetings and management cost around processes involved in operating a data center.

TABLE I

SAMPLE TICKET DATA

| WONUM | Work Order Description |
|---|---|
| W9979846 | Installation of Recover console on SV73412 |
| Categorization | Failure Class |
| APPLICATION | OS/SYSTEM SOFTWARE |
| WORKTYPE | Resolution |
| SREQ | Recovery Console installed on the server |

Typically, tickets contain both pre-defined, structured fields (e.g., problem type, support person/group handling the problem, ticket creation date, failure cause, failure class fields, etc.) as well as, unstructured fields (e.g., open ended text describing problems and solutions as entered by the support administrators), as shown in FIG. 1. Table I illustrates a typical ticket data. It contains both pre-defined fields, as well as open ended text fields. As can be seen, problem descriptions are about the descriptions of problems as supplied by customers, whereas the descriptions about problem solution were provided by a system administrator.

When a business analytics query is issued, or a ticket is submitted to the ticketing system, it is important to provide a degree of confidence on the results provided or data captured. If the score provided is insufficient and creates too much risk, the results should be discarded, unless there is a way to improve on their quality. Embodiments of the invention aim to evaluate the quality of a result and assist on improving it through the involvement of related parties that can attest for the data and may provide additional information to correct or improve existing data elements.

A quality assessment module, as used herein, assigns a confidence score to tickets and other data (e.g., server utilization, server purpose, etc.). The overall confidence score also takes into account the reliability of the data source, whether human or system driven. Confidence of the human input is derived from their expertise/familiarity with the given system and prior contributions. To bootstrap quality assessment, data elements can be grouped by type, nature and their purpose to establish minimal expected confidence levels.

Figure 2:
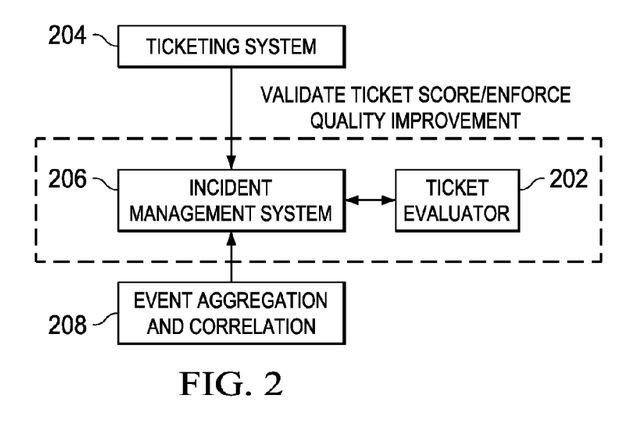
FIG. 2 is a block diagram illustrating an embodiment of the invention, which comprises a ticket evaluator in an environment of use.

Referring to FIG. 2, there is shown a useful embodiment of a quality assessment module as described above, which comprises a ticket evaluator 202. Ticket evaluator 202 is used in connection with a ticketing system 204 and an incident management system 206, which generate service logs or records as part of customer service support. As described above, such records are referred to as tickets and contain ticket data, as shown for example by the ticketing tool of FIG. 1. FIG. 2 further shows ticket evaluator 202 used with event aggregation and correlation module 208.

As stated above, before a ticket for any work item can be closed, the quality of data recorded on the ticket is automatically evaluated. This task can be carried out by ticket evaluator 202, which evaluates a ticket based on its content, and determines a numerical grade or score for the ticket. The score represents the quality of the ticket. Tickets with insufficient quality cannot be closed. Thus, ticket evaluator 202 is useful in enforcing ticket quality improvement.

Referring to FIG. 3, there are shown fields of a simplified ticket 300 for recording service data. Certain of these fields are particularly useful for measuring the quality of information contained on the ticket, by means of a quality assessment module such as ticket evaluator 202 of FIG. 2. These useful fields include, as examples, failure class field 302, failure symptom field 304, and worktype field 306, work order description field 308, and classification description field 310.

A quality assessment module such as ticket evaluator 202 assigns a confidence score to incoming tickets by giving each ticket a numeric score on a scale, and determining a threshold, which separates tickets into satisfactory and unsatisfactory confidence and quality level data. To assess the quality of incoming tickets, a two-stage approach was taken. In the first stage, ticket quality was evaluated based on the completeness of the following fields, referred to as pull down fields: failure class, failure symptom and worktype. It was decided to use these fields for analysis because of the importance of information they carry. These fields specify whether performed work was a part of a service request, problem, or maintenance, and give information on the technical area the work was performed on, (e.g., was it in the application domain, OS domain, hardware problem, or a new server that was built or migrated.) Different embodiments might opt to use different fields. A single point (grade) was assigned to a ticket for each one of the three desired pull down fields. More particularly, for each field that was filled in, or which had an entry value, a point was added for that field. Otherwise, no point was added.

As a second stage, ticket quality assessment incorporated an analysis of the work order description, which is an open ended text field in a ticket. First, a number of keywords were identified, such as meeting, network and build. Then, the length of the work order description was observed, as an indicator of the ticket's potential quality. In one analysis, a majority of multiple tickets each had a description of at least 20 characters, which is sufficient if the key activity is captured (e.g., build server). Also, more than half of these tickets had at least one keyword, and 85% had at least two matching keywords.

In the analysis, the grading mechanism was extended to include both drop down values and the work order description (open ended text). The final grade was assigned as follows: One numerical grade was assigned for availability of each value in the following pull down (or drop down) fields: failure symptom, failure class and worktype. Also, the length of work order description would be multiplied by a coefficient C in order to normalize the string length against the ticket corpus. The coefficient of 0.3 was selected in order to provide a weight to the length of the work order description. This value was selected based on the maximum length of the work order description in a sample. Equation 1 shows that adding a sum of grades in dropdown fields to the number of keywords occurring with the normalized string length results in the final grade, as follows:

Final Grade=Sum(Drop-Down-Fields)+C×Length(Work-Order-Description)Count(Keywords-Found)     Eqn. (1)

Figure 4:
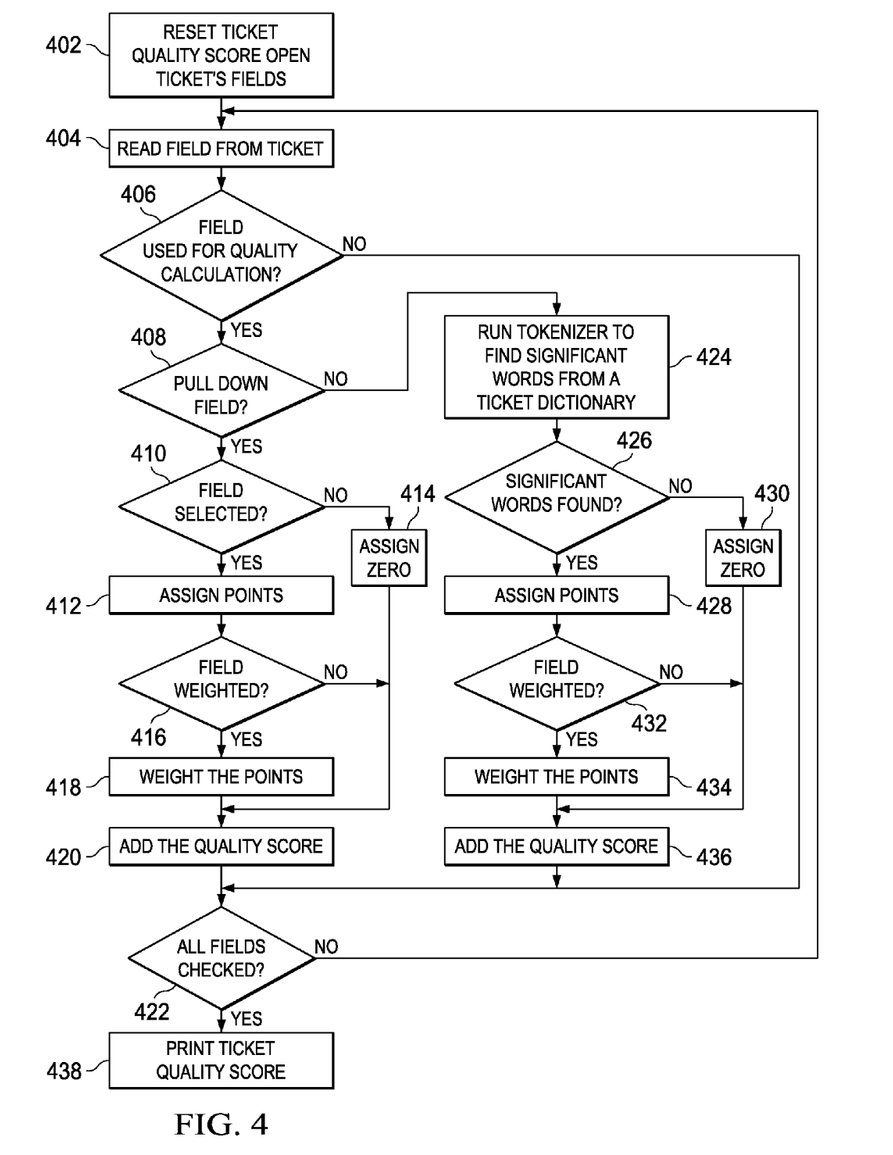
FIG. 4 is a flow chart illustrating operation of a ticket evaluator that comprises an embodiment of the invention.

Referring to FIG. 4, there are shown steps of a procedure or method for operating a ticket evaluator 202, to compute a ticket quality score in accordance with the two stage approach described above. At step 402, ticket quality score is reset, and the fields of a ticket made available to evaluator 202 are opened. A given field is read from the ticket at step 404, and at decision step 406 it is determined whether information in that field is to be used for quality calculation. If it is, the method proceeds to decision step 408. Otherwise, the method proceeds to decision step 422, which decides whether or not all fields of the ticket have been considered. If not, the method loops back to step 404.

At step 408, it is determined whether or not the given field is a pull down field, such as worktype or failure class. If the decision at step 408 is negative, the method proceeds to step 424. If the decision is affirmative, the method proceeds to decision step 410, to determine whether the given field had been selected on the ticket being evaluated, that is, whether an entry had been made in that field, when the ticket was being prepared. If so, one or more points are assigned to the field at step 412, to give the field a numeric score, and the method goes to decision step 416. Otherwise, at step 414 zero points are assigned to the field, and the method moves on to step 420.

Decision step 416 decides whether or not the given field is to be weighted. If so, the score or point value of the field is weighted at step 418, and the method proceeds to step 420. If the decision at step 416 is negative, the method proceeds directly to step 420. At step 420, the point value of the given pull down field which has just been processed at steps 404-414, as described above, is added to the sum of the scores for all previously processed pull down fields. Step 420 thus outputs a cumulative quality score for all the pull down fields of the ticket.

Referring further to FIG. 4, if a field is determined not to be a pull down field at step 408, it can be an open ended text field. Accordingly, at step 424 a tokenizer is run on each field directed thereto, to see if any words included in the text of the field are significant words from a ticket dictionary. As described above, work order descriptions and other open ended text fields of multiple or a large number of tickets can be analyzed, to identify frequently used keywords such as meeting, network and build. These keywords may then be used to construct a ticket dictionary for step 424. Construction of a ticket or system dictionary is described hereinafter in further detail.

At step 426, if significant words are not found in the text of the field, zero points are assigned to the field at step 430, and the method proceeds to step 436. However, if significant words are found, the method proceeds to step 428, and one or more points are assigned to the field. Step 432 determines whether or not the assigned points should be weighted, and if so, they are weighted at step 434. In one example of implementing steps 428, 432, and 434, which was described above, points could be assigned based on the length of the open ended text field, or the number of characters included therein. The points would then be weighted, by applying a coefficient to the field text length.

At step 436, the point value of the open ended text field which has just been processed at steps 424-434, as described above, is added to the sum of the scores for all previously processed fields of such type. Step 436 thus outputs a cumulative quality score for all the open ended text fields of the ticket.

The quality score outputs of both steps 420 and 436 are directed to decision step 422, described above. If all fields have been checked at step 422, the method is directed to step 438. At step 438, the scores from steps 420 and 436 are added, to provide the total quality score of the given input ticket.

In connection with the ticket evaluator, a ticket is represented as a weighted vector T, where T(k) is the importance/quality of the field k. Each ticket is concatenated into a single string allowing use of a Levenshain function to calculate the distance, and to cluster the tickets to derive a baseline/expected quality level. Examples of fields that are most critical include pull down fields, such as failure class, failure symptom, and worktype; and open ended fields, such as work order description and classification description.

For each ticketing system, a weighted vector T with importance of individual fields can be programmable, and the importance of individual fields has to be defined. The vector T is programmable, so that only new values of importance fields have to be uploaded. Also, different fields can be considered important, depending on the target analysis. Examples of such fields are as follows:

A. Start and end date and time fields for various analysis of efficiency, and week-date dependency, can be important to identify days with the peak workload to assign more SAs.

B. Ticket severity and administrator's ID correlation can be important to identify the most efficient system administrators (SAs).

C. Time ticket being worked on and ticket type can be important to identify the most time consuming issues.

D. Frequency of the type of tickets and time being worked on can be important to identify the most labor intensive task whose increase efficiency can bring the biggest savings.

In order to handle open ended fields, and to enable reasoning about the ticket content, the system relies on the taxonomy of the IT support domain. A system dictionary W representing common (technical problem) phrases and associated keywords, is also relied on. By parsing tickets and solution repositories (best practices), a tree structured taxonomy is generated. This is used to compute contextual relevance between the ticket T and cluster H of similar tickets (and keywords). Contextual relevance of Tk against Hi (history buffer–cluster of tickets) has the following relationship:

$C(Tk; Hi) - |Hi|/\text{Sum}_{(Tj\ in\ Hi)}\text{dist}(dk; dj)$     Eqn. (2)

The above can also be used to identify conflicts between classification and ticket description by identifying keywords that are unusual, (e.g., a ticket classified as a PERFOR- MANCE issue and a work description to UPGRADE the software.) This in turn may better be categorized as a PATCH/CHANGE type of work.

Figure 5:
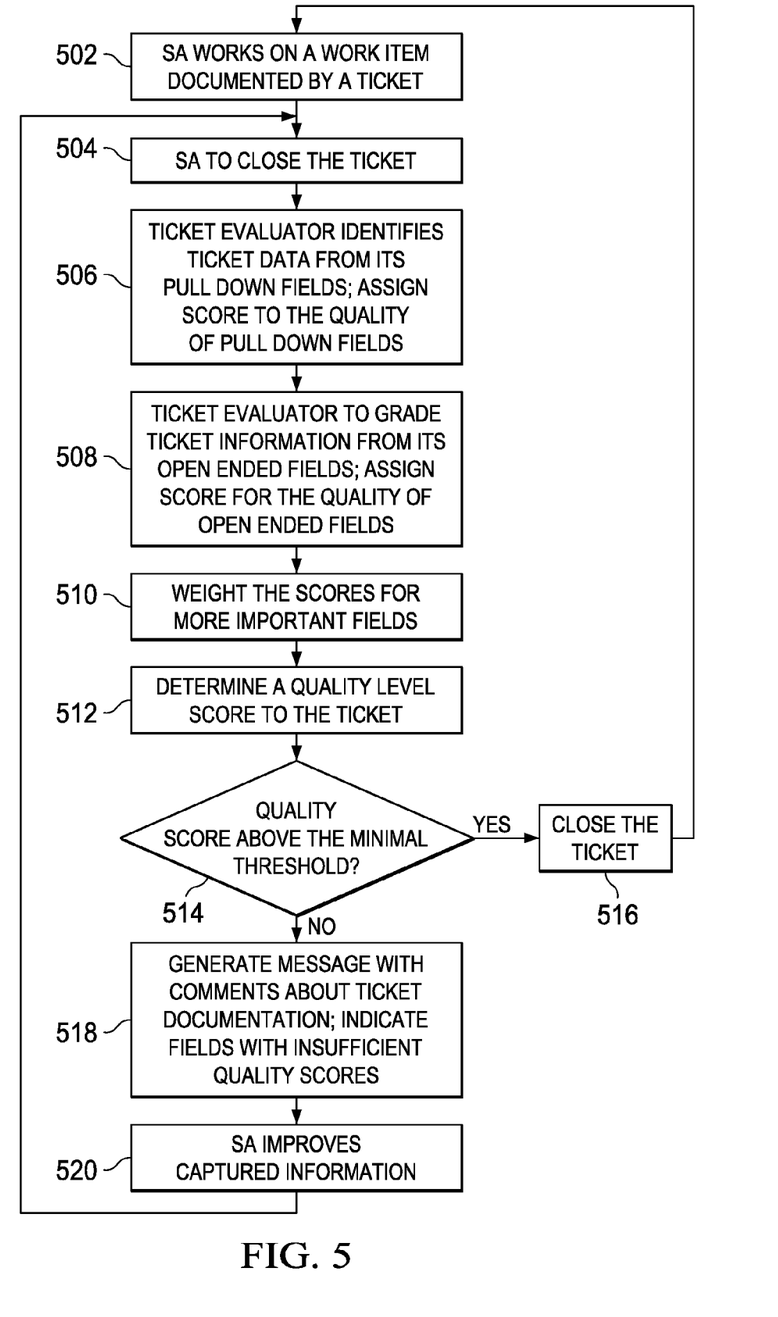
FIG. 5 is a flowchart showing steps for a method associated with the embodiment of FIG. 4.

Referring to FIG. 5, there are shown steps of a method for controlling the flow of a work item documented by a ticket. At step 502, an SA works on a work item, wherein information pertaining to the work item is documented by the entries on respective fields of a ticket. At step 504, the SA takes action to close the ticket. Accordingly, at step 506 a ticket evaluator, such as evaluator 202 of FIG. 2, identifies ticket data from respective pull down fields of the ticket. A cumulative score for the quality of these fields is then assigned to the ticket. Usefully, this score for the pull down fields is computed as described above in connection with FIG. 4.

At step 508 of FIG. 5, the ticket evaluator similarly grades ticket information from its open ended fields, and computes a cumulative score for the quality of these fields. At step 510 the scores for more important fields are weighted. At step 512, the respective cumulative scores for the pull down fields and the open ended fields are combined, to determine an overall quality level score for the ticket. In like manner with step 506, the tasks of steps 508, 510, and 512 can each be carried out as described above in connection with FIG. 4.

At decision step 514, it is necessary to determine whether the overall quality score of the ticket exceeds a minimal quality threshold. If so, the ticket can be closed at step 516. Otherwise, the method proceeds to step 518. This step generates a message with comments about ticket documentation, and also indicates fields that have insufficient quality scores. At step 520, the SA can revise the ticket, to improve the information recorded or captured thereon. The method of FIG. 5 then returns to step 504.

Figure 6:
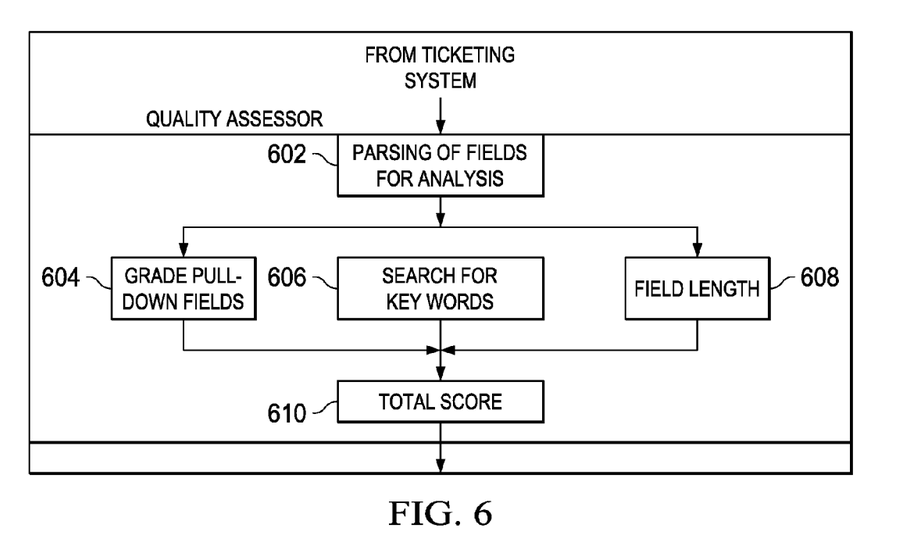
FIG. 6 depicts a further embodiment of the invention.

Referring to FIG. 6, there is shown the basic building block of a further embodiment of a quality assessor module, as used in the flow of operations. Tickets are inserted from a ticketing system, after system administrators have completed their work and closed their tickets. From all data of a ticket, only selected fields are parsed, at module 602, and sent to other modules for grading. These include module 604 for grading the pull down fields. They further include modules 606 and 608, which are used in grading open ended text fields. Module 606 searches for key words, and module 608 assesses field length, as described above. Finally, the overall score of the ticket is determined at module 610.

The quality value of a ticket is threefold. Firstly, tickets are used for reporting purposes and insights about the operations (e.g., peak hours in the support center). Secondly, tickets that have encoded a problem resolution approach are useful for knowledge transfer purposes. The solution to the ticket problem is often verified by a knowledge administrator and eventually shaped into a documented best practice. In addition, such tickets can be used for training of new system administrators. A third benefit of high quality tickets is the ability to use them to provide predictive analytics on incoming tickets, to identify expected categorization, and/or suitable descriptions of the problems.

Figure 7:
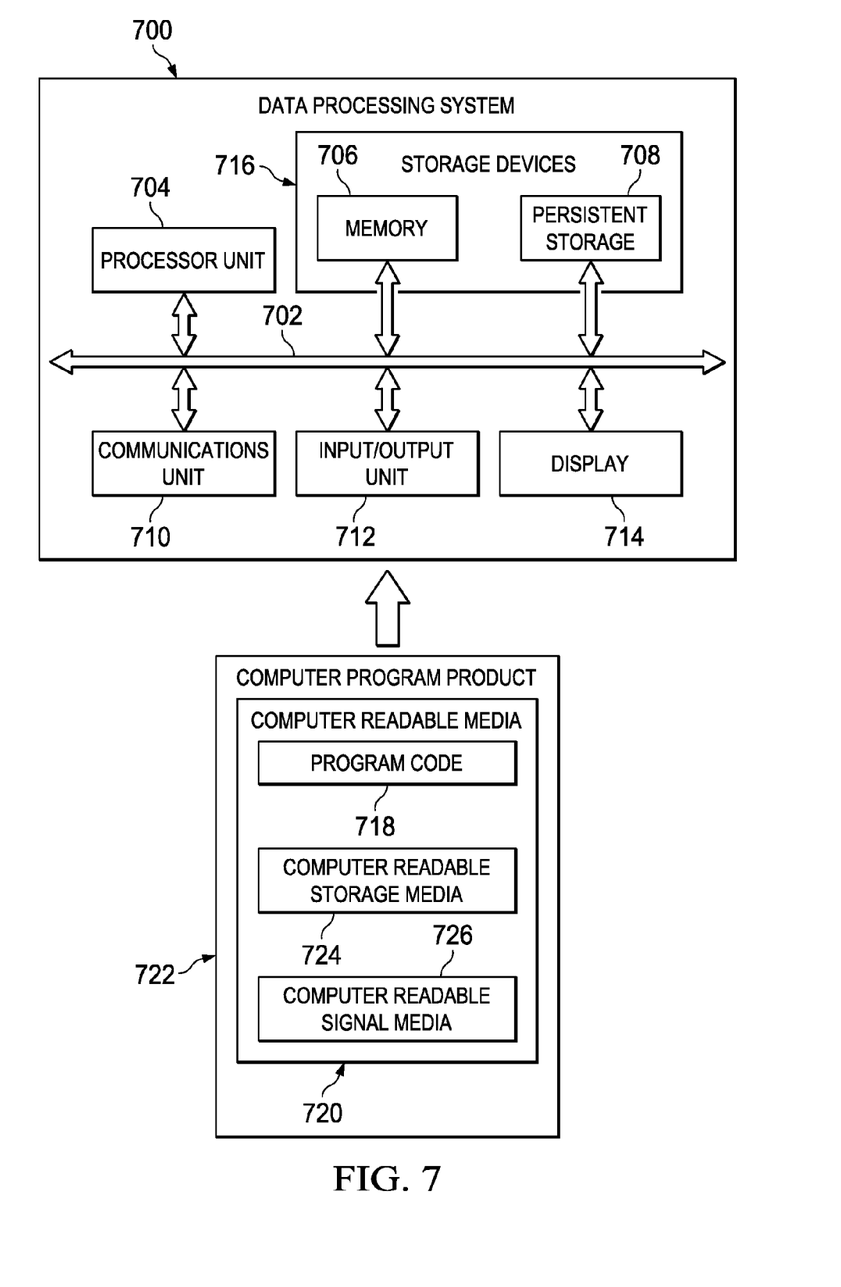
FIG. 7 is a block diagram showing a computer or data processing system that may be used in implementing embodiments of the invention.

FIG. 7 depicts a diagram of a data processing system in accordance with an illustrative embodiment. Data processing system 700 is an example of a computer, which may be used to implement one or more components of embodiments of the invention, and in which computer usable program code or instructions implementing the processes may be located for the illustrative embodiments. In this illustrative example, data processing system 700 includes communications fabric 702, which provides communications between processor unit 704, memory 706, persistent storage 708, communications unit 710, input/output (I/O) unit 712, and display 714.

Processor unit 704 serves to execute instructions for software that may be loaded into memory 706. Processor unit 704 may be a set of one or more processors or may be a multi-processor core, depending on the particular implementation. Further, processor unit 704 may be implemented using one or more heterogeneous processor systems, in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Memory 706, in these examples, may be, for example, a random access memory, or any other suitable volatile or non-volatile storage device. Persistent storage 708 may take various forms, depending on the particular implementation. For example, persistent storage 708 may contain one or more components or devices. For example, persistent storage 708 may be a hard drive, a flash memory, a rewritable optical disk, a rewritable magnetic tape, or some combination of the above. The media used by persistent storage 708 may be removable. For example, a removable hard drive may be used for persistent storage 708.

Communications unit 710, in these examples, provides for communication with other data processing systems or devices. In these examples, communications unit 710 is a network interface card. Communications unit 710 may provide communications through the use of either or both physical and wireless communications links.

Input/output unit 712 allows for the input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications fabric 702. In these illustrative examples, the instructions are in a functional form on persistent storage 708. These instructions may be loaded into memory 706 for execution by processor unit 704. The processes of the different embodiments may be performed by processor unit 704 using computer implemented instructions, which may be located in a memory, such as memory 706.

These instructions are referred to as program code, computer usable program code, or computer readable program code that may be read and executed by a processor in processor unit 704. The program code, in the different embodiments, may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722. In one example, computer readable media 720 may be computer readable storage media 724 or computer readable signal media 726. Computer readable storage media 724 may include, for example, an optical or magnetic disc that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory that is connected to data processing system 700. In some instances, computer readable storage media 724 may not be removable from data processing system 700.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative embodiments, program code 718 may be downloaded over a network to persistent storage 708 from another device or data processing system through computer readable signal media 726 for use within data processing system 700. For instance, program code stored in a computer readable storage media in a server data processing system may be downloaded over a network from the server to data processing system 700. The data processing system providing program code 718 may be a server computer, a client computer, or some other device capable of storing and transmitting program code 718.

The different components illustrated for data processing system 700 are not meant to provide physical or architectural limitations to the manner in which different embodiments may be implemented. The different illustrative embodiments may be implemented in a data processing system including components in addition to and/or in place of those illustrated for data processing system 700. Other components shown in FIG. 7 can be varied from the illustrative examples shown. The different embodiments may be implemented using any hardware device or system capable of executing program code. As one example, data processing system 700 may include organic components integrated with inorganic components and/or may be comprised entirely of organic components excluding a human being. For example, a storage device may be comprised of an organic semiconductor.

As another example, a storage device in data processing system 700 is any hardware apparatus that may store data. Memory 706, persistent storage 708, and computer readable media 720 are examples of storage devices in a tangible form.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 706 or a cache such as found in an interface and memory controller hub that may be present in communications fabric 702.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for assessing quality of recorded service data, comprising the steps of:
    a computer selecting and processing multiple tickets to produce a keyword dictionary of terms in the multiple tickets;
    the computer receiving, by the processor, a record containing service data at a service record evaluator, the record comprising a specified ticket having a plurality of information fields, the plurality of information fields including a pull down field and an open end text field;
    the computer selecting the pull down field and the open end text field;
    the computer determining a first numerical quality score for the pull down field;
    the computer, using the keyword dictionary, identifying keywords included in the open end text field;
    the computer determining a second numerical quality score for the open end text field by multiplying a count of the keywords in the open end text field times a length of a work order description in the open end text field and a coefficient that normalizes the length of the work order description against a corpus of the multiple tickets;
    the computer combining the first numerical quality score and the second numerical quality score to obtain a cumulative quality score for the record;
    the computer determining that the cumulative quality score is less than a minimum quality threshold; and
    the computer generating, responsive to determining that the cumulative quality score is less than the minimum quality threshold, a message indicating one or more fields with insufficient quality scores.

2. The method of claim 1, wherein the pull down field is selected from a group that includes at least a worktype field, a failure class field, and a failure symptom field.

3. The method of claim 1, wherein:
    the open end text field is selected from a group that includes at least a work order description field, and a classification description field.

4. The method of claim 1, wherein the quality score for at least one information field is selectively weighted.

5. The method of claim 1, wherein the ticket will be closed only if the cumulative quality score is no less than the minimum quality threshold.

6. The method of claim 5, wherein:
the computer, responsive to a failure to close the ticket, generates a message which includes comments regarding ticket documentation.

7. The method of claim 6, wherein:
the message indicates respective fields that have insufficient quality scores.

8. The method of claim 6, further comprising:
the computer, responsive to generating the message, receives selective revisions of information contained in the ticket.

9. The method of claim 1, further comprising:
the computer determining the quality score for the open end text field includes determining a text length of said open end text field.

10. The method of claim 9, further comprising:
the computer determining the quality score for the open end text field includes multiplying the length thereof by a selected coefficient.

11. The method of claim 1, further comprising:
the computer calculating a contextual relevance of $T(k)$ against $Hi$, where $T$ is a weighted vector and $T(k)$ is an importance or a quality of $k$, wherein $k$ is a pull down field or an open ended text field, and wherein $Hi$ is a history buffer minus a cluster of tickets.

* * * * *